(12) United States Patent
Campbell et al.

(10) Patent No.: US 6,846,855 B2
(45) Date of Patent: Jan. 25, 2005

(54) SIZED REINFORCEMENTS, AND MATERIALS REINFORCED WITH SUCH REINFORCEMENTS

(75) Inventors: Les E. Campbell, Anderson, SC (US); Sanjay P. Kashikar, Kelmis (BE)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 283 days.

(21) Appl. No.: 09/847,009

(22) Filed: May 1, 2001

(65) Prior Publication Data

US 2002/0198301 A1 Dec. 26, 2002

(51) Int. Cl.$^7$ .............................. C08K 9/06; C08K 5/09; C08L 51/00
(52) U.S. Cl. ....................... 523/213; 523/214; 524/269; 524/321; 524/492; 524/504
(58) Field of Search .................. 523/213, 214; 524/269, 321, 492, 504

(56) References Cited

U.S. PATENT DOCUMENTS

| | | | |
|---|---|---|---|
| 3,655,353 A | | 4/1972 | Nalley et al. |
| 4,394,418 A | | 7/1983 | Temple |
| 4,426,469 A | | 1/1984 | Marzola et al. |
| 4,483,948 A | | 11/1984 | Tamosauskas |
| 5,242,969 A | * | 9/1993 | Arpin et al. |
| 5,437,928 A | | 8/1995 | Thomons et al. |
| 5,646,207 A | | 7/1997 | Schell |
| 5,883,023 A | | 3/1999 | Martine et al. |
| 6,106,982 A | * | 8/2000 | Mientus et al. |
| 6,139,955 A | | 10/2000 | Girgis |
| 6,211,280 B1 | | 4/2001 | Schell |

FOREIGN PATENT DOCUMENTS

| | | | |
|---|---|---|---|
| WO | WO 99/35172 | * | 7/1999 |
| WO | WO 00/48957 | | 8/2000 |

* cited by examiner

*Primary Examiner*—Tae H. Yoon
(74) *Attorney, Agent, or Firm*—Inger M. Eckert; Maria C. Gasaway

(57) ABSTRACT

A sizing composition and method for manufacturing such, which is suitable for use in manufacturing fiber-reinforced composites which have desirable properties such as high strength, high resistance to water and chemical degradation, and improved coloring. This is achieved in part by good adhesion of the sizing composition to the reinforcing fibers and the polymer matrix. The sizing composition includes an emulsion having a grafted polyolefin, two or more saturated fatty acids, and one or more silane coupling agents. When reinforcing fiber materials sized according to the invention are used in a molding process, the resulting composites are observed to show minimal discoloration.

21 Claims, No Drawings

SIZED REINFORCEMENTS, AND MATERIALS REINFORCED WITH SUCH REINFORCEMENTS

TECHNICAL FIELD AND INDUSTRIAL APPLICABILITY OF THE INVENTION

The present invention relates to a sizing composition for coating glass or other reinforcing fiber materials that are used in the manufacturing of composites, which have desirable properties such as high strength and high resistance to chemical degradation.

The sizing composition of the present invention also yields composites of more neutral or natural coloring, and minimizes or eliminates discolorations associated with conventional sizing compositions without requiring the use of an optical brightener.

The sizing composition of the present invention may also be used to coat reinforcing fibers for use in composites that may subsequently be pigmented to obtain a desired color. In this regard, the composition advantageously provides better color matching during the pigmentation process without the need for color compensating additives.

BACKGROUND OF THE INVENTION

The reinforced composite industry has historically used reinforcing fibers, such as glass, in the form of continuous or chopped fibers, strands, and rovings to reinforce polymer matrices. These are used to make a wide range of composite products that possess a high degree of resilience and load-bearing ability. Such composite products may also be manufactured to possess decorative characteristics such as patterns, surface embossing, and coloration.

Glass reinforced polyolefin composites can be found in automotive, electrical and household appliance industries. Their use often requires combinations of specific mechanical, physical, chemical, and aesthetic properties. In many reinforced polyolefin composite applications, high strength, high resistance to chemical degradation, and improved coloring are highly desirable properties. It is also highly desirable to produce polyolefin composites with mechanical properties such as low tensile creep and high resistance to fatigue. These parameters are considered when predicting the composite parts useful life span, and also when designing the composite part, often affecting its final thickness and weight.

The sizing composition plays a key role in determining the properties of the reinforced composite part. During manufacturing of the composite part, the sizing composition forms an interphase between the reinforcing fiber and the polymer matrix. When a load is applied to the composite part, force is transferred from the matrix to the fibers. A strong interphase is desired for high composite strength. High composite strength can be achieved with good adhesion of the fiber surface to the interphase, as well as from good adhesion between the interphase and the polymer matrix.

Good adhesion between the interphase and polymer matrix is generally acheived by the use of an appropriate sizing composition applied to the fibers. Although it may be relatively easy to tailor and improve a single specific property of the composite, it is difficult to improve several properties at the same time. For example, a sizing composition may be used to form a composite part with good initial strength. However, this composition may not form a composite with other properties such as good hydrolysis and detergent resistance, or good resistance to discoloration.

Therefore, it is desirable that the sizing composition form an interphase that is strong, resistant to thermal degradation, resistant to chemical degradation, provides good adhesion between the fiber and sizing composition, and provides good adhesion between the sizing composition and the polymer matrix. Also, the sizing composition must be compatible with both the reinforcing fibers, which may be inorganic, and the polymer matrix, which may be organic.

In order to achieve composites with improved color, it is necessary to have a sizing composition comprising thermally stable ingredients that provide high resistance to oxidation and yellowing.

Traditionally, sizing compositions used in polypropylene composites are characterized by an aqueous emulsion of a film former having a highly modified polypropylene resin of low molecular weight. For example, ChemCorp 43N40, an aqueous emulsion of a maleic anhydride grafted polypropylene resin (E43 from Eastman Chemical Company) may be used as the main film forming agent in a sizing composition. E43 has an average molecular weight of 9000, and represents a resin with relatively low molecular weight. Although a sizing composition based on this film former would be compatible with the reinforcing fibers and the polypropylene matrix resin, the final interphase formed is not strong due to the lower mechanical strength of this film former. Composite parts made from this sizing composition may possess insufficient short-term and long-term mechanical properties.

Additionally, in many similar sizing compositions, the surfactant package used in the film former emulsion contains low molecular weight chemicals which may be unsaturated, have one or more amine groups, or have amino groups which may be characterized as cationic in nature. These chemicals contribute to poor composite properties such as the discoloration of the composite part. Examples of these chemicals are unsaturated fatty acids (such as oleic, linoleic, and linolenic acids) and amine based neutralizing agents (such as triethylamine and nitrogen containing cationic surfactants). These agents can further cause yellowing and discoloration of the composite. Such properties make the final composite part unsuitable for many applications, and limit their use. Therefore, there is a need for a sizing composition which overcomes these problems.

Discoloration in molded composite products, or in the materials used to manufacture molded composite products, may arise from the presence of contaminants in one or more materials that make up the composite formulation, or from the presence of impurities in the ingredients that are used to form fiber-reinforced composites. These ingredients may be materials used in sizing compositions for coating reinforcing fibers before they are molded into composites. For example, conventional sizing compositions often impart a yellow color or other discoloration to fiber reinforcements after such sizings are applied. These discolorations are then carried over into the composite product when the reinforcements are molded. These discolorations may be caused by oxidative decomposition of unsaturated chemicals, such as fatty unsaturated surfactants and/or lubricants, which are of low thermal stability. These discolorations may also be caused by nitrogen containing compounds, such as amides, imides, cationic surfactants or amine-based chemicals, which are used, for example, as neutralizing agents.

Historically, the problem of discoloration has been partially addressed by adding ingredients to the composite formulation to counteract the discoloration before the composite formulation is molded. Frequently, antioxidants are used in the compounding formulations to minimize thermal degradation and associated discoloration. Also, the added ingredient may be a colorant, e.g., pigment or dye, that changes the color of the composite formulation. For example a blue pigment or dye may be added to the composite formulation to combat a yellow discoloration and, as a result, the finished molded composite appears whiter.

A more recently developed method of correcting discoloration has been adapted to fiber-reinforced composite manufacturing. Although, it has traditionally been used in compositions applied to paper products, clothing, and plastics to create a brilliant white appearance. This method involves adding an optical brightener, such as a fluorescent whitening or brightening agent, to the composite formulation or to the sizing compositions that are applied to the fiber reinforcements used to mold composites. U.S. Pat. No. 5,646,207, for example, describes a sizing composition that includes a fluorescent whitening agent in addition to other sizing ingredients such as a carboxylated polypropylene, a silane coupling agent, and a lubricant. However, compositions such as those disclosed in this patent rely specifically on the presence of the fluorescent whitening agent to reduce discoloration in the composite product.

Use of an optical brightener does not, however, satisfactorily solve the problem of discoloration in the molded composite. According to U.S. Pat. No. 5,646,207, discoloration problems in the molded composite remain when the fluorescent whitening agent is added to the composite formulation because, in order to prevent discoloration satisfactorily, the fluorescent whitening agent must be well dispersed into the matrix polymer of the composite formulation. At the same time, the patent notes that uniform dispersion of the fluorescent brightener in the matrix polymer is difficult to achieve.

Other technical and economic problems stem from the use of optical brighteners such as a fluorescent whitening agent in composite formulations and in particular, in sizing compositions for fiber reinforcements. Technical problems may compromise the quality of the composite product, including degradation of the composite matrix polymer or undesirable interactions with other composite ingredients. For example, an optical brightener typically accelerates degradation of the matrix polymer when it is exposed to ultraviolet (UV) light or other forms of radiant energy. Moreover, optical brighteners themselves can degrade chemically over time, and thus contribute to yellowing or other discoloration of molded composite articles. Another observed problem arises when an optical brightener reacts with other ingredients such as an antioxidant that may be added to the composite formulation. In this regard, combining the optical brightener and the antioxidant reduces the efficiency of both ingredients, and ultimately results in discoloration of the composite.

Additionally, it has been observed that color matching of composite batches is difficult to achieve when the composite contains optical brighteners. In order to compensate for these difficulties in color matching, varying amounts of pigments or other additives have been added to the composite, which makes it difficult to maintain consistent color between batches. The difficulties encountered in turning out composite batches having consistent color, in turn, increases the cost of production by requiring more starting materials and higher labor costs, and therefore poses an economic disadvantage in addition to the technical problems. Further, color analysis of molded articles that contain optical brighteners is difficult because the articles behave differently under different lighting types and conditions. These problems with color analysis also increase the costs of producing the fiber reinforcements and/or the composite product. The use of optical brighteners further contributes to increased production costs simply because they are expensive chemicals.

In some applications, such as the manufacturing of washing machine parts, it may be desired that the molded composite product have a white color. In this regard, whitening pigments have been added directly to the composite molding composition to provide the white coloration. One such typically used whitening pigment is powdered titanium dioxide ($TiO_2$). However, the addition of whitening pigments such as $TiO_2$ results in damage to the reinforcing glass fibers and dramatically reduces the mechanical strength of the composite.

Therefore, there is a need in the art for a cost-effective sizing composition which, when applied to reinforcing fibers used in a composite molding process, provides increased whiteness, brightness and/or color compatibility in the molded composite product, without requiring the use of an optical brightener, while maintaining the desirable strength properties of the molded composite product. There is also a need for a sizing composition that is stable to oxidation degradation and which, when applied to reinforcing fiber materials used in the manufacture of molded composites, will not result in discoloration of the molded composite product. There is also a need for a sizing composition that is stable to oxidation degradation and resistant to thermal degradation thereby creating a stronger interphase, which provides desirable short-term and long term mechanical properties, and increased resistance to chemical and thermal breakdown of the reinforced composite part.

SUMMARY OF THE INVENTION

One or more needs in the prior art, as described above, is met by the present invention. The invention relates to a substantially non-discoloring sizing composition for reinforcing fiber materials, comprising an emulsion comprising a grafted polyolefin, a blend of two or more saturated fatty acids, and one or more silane coupling agents.

The invention also relates to a fiber coated with a substantially non-discoloring sizing composition, e.g., for reinforcing materials, comprising an emulsion comprising a grafted polyolefin, a blend of two or more saturated fatty acids, and one or more silane coupling agents.

The invention also relates to a method of making a substantially non-discoloring sized reinforcing fiber material, comprising preparing a sizing composition comprising an emulsion comprising a grafted polyolefin, a blend of two or more saturated fatty acids, and one or more silane coupling agents; contacting the surfaces of a plurality of filaments of a reinforcing fiber material with the sizing composition; and allowing the sizing composition to solidify on the surfaces of the plurality of filaments to form a substantially non-discoloring reinforcing fiber material.

The invention further relates to a method of making a fiber-reinforced composite, comprising applying a substantially non-discoloring sizing composition comprising an emulsion comprising a grafted polyolefin, a blend of two or more saturated fatty acids, and one or more silane coupling agents on the surfaces of a reinforcing fiber material to form a sized reinforcing fiber material; and molding the sized reinforcing fiber material with a matrix resin to form a fiber-reinforced composite having minimal discoloration.

The invention further relates to a composite comprising a fiber coated with a substantially non-discoloring sizing composition for reinforcing fiber materials, that provides enhanced short term and long term composite strength, higher resistance to chemical degradation (due to hydrolysis or detergents) comprising an emulsion comprising a grafted polyolefin, a blend of two or more saturated fatty acids, and one or more silane coupling agents.

Further objects, features, and advantages of the invention will become apparent from the detailed description that follows.

DETAILED DESCRIPTION OF THE PREFERRED EMBODIMENTS OF THE INVENTION

In one embodiment, the present invention comprises a composition that is suitable for sizing reinforcing fiber materials to be used in the manufacturing of fiber reinforced composites. The sizing composition provides improved short-term mechanical performance of a fiber-reinforced composite such as increased strength. The sizing composition also provides improved long-term mechanical performance of the composite such as increased resistance to creep and fatigue. In another embodiment, the sizing composition provides a composite with higher resistance to thermal and chemical breakdown, including breakdown due to hydrolysis.

Properties such as whiteness, neutral coloring and ease of color matching of the fiber reinforced composite are desired in addition to good short-term and long-term mechanical performance, and good resistance to thermal and chemical breakdown. Although not completely understood, it is believed that the discoloration associated with the thermal oxidation or thermal degradation of the sizing composition relates to degradation of the interphase. This causes poor adhesion between the fiber and polymer matrix leading to decreased overall mechanical performance of the composite. The present invention provides improved performance of the reinforced composite by selecting components of the sizing composition that resist thermal oxidation or thermal degradation.

In another embodiment, the present invention comprises a substantially non-discoloring sizing composition. The term "substantially non-discoloring" or "having minimal discoloration", as used herein, is intended to mean that the sizing composition does not cause any discoloration of either the reinforcing fiber material treated with the sizing, or the composite formed therefrom, or alternatively, the sizing composition causes only de minimis coloration such that the whiteness or neutral color in the reinforcing fiber material or the resulting molded composite is optimized. The term is also intended to mean that the reinforcing fiber material or molded composite product may be color matched with other batches of similar materials without the technical and economic difficulties typically associated with variations in color caused by the inclusion of an optical brightener.

While the reason for the substantially non-discoloring effect of the sizing composition of the present invention has not been definitively established, the inventors believe that it may be due, in part, to the fact that the selected sizing composition components provide better resistance to thermal or oxidative degradation. The components are preferably based mainly on molecular species having no reactive double bonds or very few reactive double bonds, e.g., they are highly saturated. The term "highly saturated", as used herein with respect to particular sizing composition components, is intended to mean that the proportion of unsaturated organic bonds in such ingredients is nearly zero or up to a maximum of 0.35, as quantified by the ingredient's Iodine Value. This means that the components are also free of any highly unsaturated molecular species, such as unsaturated chemicals, unsaturated surfactants, unsaturated lubricants, unsaturated wetting agents, unsaturated antifoaming agents and other unsaturated compounds.

It is believed that the unsaturation or double bonds in these unsaturated compounds causes them to be more reactive to chemical degradation mechanisms, such as oxidation. As a result, the compounds are more prone to develop discoloring reaction products in the sizing formulation or in the composite formulation. The substantially non-discoloring effect may also be partly attributable to the preferred absence of nitrogen containing compounds, such as some amines, imides, and amides, including fatty amines, fatty amides, and nitrogen containing cationic surfactants which cause discoloration. Similarly, nitrogen containing compounds which do not discolor may be used while maintaining the non-discoloring property. In contrast to the aforementioned types of compounds, the sizing composition of the present invention is based on highly saturated chemicals, or chemicals having no or very few double bonds, that are oxidatively and thermally more stable than the unsaturated compounds conventionally used in this field of endeavor.

The sizing composition of the present invention includes one or more film forming polymers selected from the group of grafted or chemically modified polyolefins. The term "grafted polyolefin" or "chemically modified polyolefin", as used herein, is intended to mean a polymeric olefin that has been chemically modified and functionalized to incorporate one or more reactive groups into the main polyolefin polymer chain.

Reactive functional groups are groups that are capable of undergoing further chemical reactions with other chemical species. Some examples of such reactive functional groups are acid anhydride, carboxylic acid, hydroxyl, amino, amide, ester, isocyanate, double bonds, and epoxy. Although many types of reactive functional groups can be attached to the polyolefin chains, the most preferred groups are acid anhydrides. Generally, the level of grafted functional groups is in the range of 0.05% to 15% by weight, based on the total weight of the polymer.

A suitable grafted polyolefin for use in the present invention is added to the sizing composition as an aqueous emulsion. Examples of grafted polyolefins that may be used to form such emulsions include grafted or modified polypropylenes, grafted or modified polyethylenes and mixtures thereof. Examples of a preferred grafted polyolefin are polypropylenes grafted with maleic anhydride. Preferred emulsions are commercially available as an aqueous emulsion under the tradename ME 91725 (nonionic polypropylene emulsion), or ME 91735 (nonionic polypropylene emulsion) obtained from Michelman, Inc. headquartered in Cincinnati, Ohio, United States of America.

Typically, the amount of the grafted polyolefin emulsion in the sizing composition ranges from about 1% by weight to about 99% by weight, based on the total weight of the sizing composition. Preferably, the amount of grafted polyolefin emulsion used is from about 4% by weight to about 80% by weight. Most preferably, the amount is between about 35% to about 70% by weight.

The substantially non-discoloring sizing composition of the present invention also includes a blend of two or more saturated fatty acids. In one aspect, this blend of fatty acids serves as a nucleating agent, which is believed to affect the size and rate of crystallite (serite) growth in the reinforced composite. The rate of formation and the size of the resulting crystallites have a direct and proportionate effect on the performance of the reinforced composite. Therefore including an effective amount of the fatty acid blend as a nucleating agent has the effect of optimizing the performance of the composite, especially polyolefin composites.

In another regard, the blend of saturated fatty acids serves as a lubricant in the sizing composition. Whereas sizing compositions previously known in the prior art included lubricants such as the cationic lubricant disclosed in WO 048957A1, the sizing composition of the present invention eliminates the need for a lubricant as a separate ingredient in addition to the fatty acid blend. In the sizing composition of the present invention, the lubricant effect is provided by the fatty acid blend and protects the fibers from breakage and shear stress. Also, it will generally reduce damage to the filaments during fiber production, handling and composite manufacturing ensuring better composite performance. It is also believed, that the fatty acid blend acts as a wetting agent providing better coverage of the fiber filaments by the sizing composition during fiber production which protects the fibers and further enhances the performance of the reinforced polyolefin composites. It is also believed that the fatty acid blend acts, to a certain extent, as a mold releasing agent during the molding operation thereby providing better surface finish to the composite parts and faster molding cycle operations.

A suitable blend of saturated fatty acids for use in the sizing composition of the present invention may be selected from two or more $C_8$–$C_{36}$ saturated fatty acids, the salts of these fatty acids, or mixtures thereof. Preferably, the blend of fatty acids comprises a mixture as a solution, dispersion, suspension or emulsion of highly saturated $C_8$–$C_{36}$ fatty acids, or salts thereof, in an aqueous or nonaqueous medium. Most preferably, the blend of fatty acids is provided as an aqueous mixture of two or more $C_8$–$C_{36}$ fatty acids, such as myristic, palmitic, pentadecanoic, margeric, stearic, behenic or sebacic acids. An example of a blend of such fatty acids is a combination of palmitic, sebacic and stearic acids, which, for example, may be obtained commercially as an aqueous emulsion under the tradename "MoldPro 1327" from Witco Polymer Additives, a subsidiary of Crompton Corp., Memphis, Tenn., United States of America. The amount of the blend of fatty acids may range from 0.05% by weight to about 80% by weight, based on the total weight of the sizing composition. Preferably, the blend of fatty acids is present in a concentration ranges from about 0.90% to about 50% by weight. Most preferable is a concentration of 2% to 30% by weight.

The substantially non-discoloring sizing composition of the present invention also includes a silane coupling agent. The silane coupling agent improves the adhesion between the reinforcing fiber material and the polymer matrix resin to be reinforced. The silane is believed to form a "bridge" between the glass fibers and the matrix resin. Reactive functional groups on the silane interact with the surface functional groups on the fibers and also with the film forming agent of the sizing composition. As discussed above, the film forming component of the sizing composition is chosen to be compatible to the matrix resin, and eventually enters the matrix resin and may chemically bond with the matrix resin. The silane coupling agent which reacts with the glass surface chemical groups can also react with the matrix resin chemical groups.

Silane coupling agents which may be used include those characterized by the following functional groups: amino, epoxy, ester, vinyl, alkyl, methacryloxy, ureido, isocyanato, and siloxane. Aminosilanes are commercially available from OSi Specialties, Inc., located in Tarrytown, N.Y., United States of America, Dow Corning, Inc. located in Midland, Mich., United States of America, or Degussa-Hüls AG located in Frankfurt, Germany. Preferred silane coupling agents include silanes containing one or more nitrogen atoms in the form of one or more of the following functional groups: amine (primary, secondary, tertiary or quaternary), amino, imino, amido, imido, ureido, isocyanateo, or azamido. Examples of these nitrogen containing silanes include, but are not limited to: phenylaminosilane, commercially available under the tradename "Y-9669" from OSi Specialties, Inc.; n-2-(vinylbenzylamino)-ethyl-3-aminopropyltrimethoxysilane-monohydrogen chloride, commercially available under the tradename "Z-6032" from Dow Corning; and gamma-aminopropyltriethoxysilane, commercially available under the tradename "A-1100" from OSi Specialties, Inc. Other useful amino silanes commercially available from Osi Specialties, Inc. include, but are not limited to products with the following trade names A-1101, A-1102, A-1106, A-1108, A-1110, A-1120, A-1126, A-1128, A-1130, A-1160, A-1170, A-1310, A-2120, Y-1387, Y-11343, Y-11542, and VS142. A preferred amino silane coupling agent is gamma-aminopropyltriethoxysilane.

Although gamma-aminopropyltriethoxysilane may be used alone, it may also be used in combination with other amino silane agents, with silanes with functional groups other than amino functional groups, or with silanes containing no nitrogen. Examples of silanes having functional groups other than amino functional groups include, but are not limited to: vinyltrimethoxysilane (commercially available as A-171), glycidyloxypropyltrimethoxysilane (commercially available as A-187), and methacryloxypropyltrimethoxysilane (commercially available as A-174), all of which are available from Osi Specialties, Inc.

The silane coupling agent is generally included in the sizing composition at a concentration of about 0.05% to about 40% by weight, based on the total weight of the sizing composition. Preferably, the silane coupling agent is used in an amount of from about 0.2% to about 25% by weight. Most preferably, the amount is between about 2% to about 15% by weight.

The sizing composition may also include one or more additives useful to improve the wettability or dispersion of the sized reinforcing fiber material in the composite matrix, as well as to improve the ease of processing and the reduction of fuzz in the sized product. Such agents may be selected from the group of coupling agents that enhance the compatibility of the sized reinforcing fiber material with the matrix resin. The group includes, but is not limited to antioxidants, antifoaming agents, processing aids, wetting agents, lubricants, antistats, and other conventionally known additives.

An antifoaming agent may be added to the sizing composition to reduce foam generation during mixing and handling of the sizing composition before the sizing composition is applied to the reinforcing fiber material. Various types of antifoaming agents may be used, such as those which are silicone based or silicone free. Examples of suitable antifoaming agents include, but are not limited to, those commercially available from BYK Chemie located in Wesel, Germany under the trade names BYK-011, BYK-018, BYK-020, BYK-021, BYK-022, BYK-023, BYK-024, BYK-025, BYK-028, BYK-031, BYK-032, BYK-033, BYK-034, BYK-035, BYK-036, BYK-037, BYK-045, or BYK-080. An antifoaming agent may be added in any amount up to 2% by weight, based on the total weight of the sizing composition. Preferably, the antifoaming agent is between about 0.001% and about 0.5% by weight. Most preferable is between about 0.005% and about 0.2% by weight.

The sizing composition may be prepared by combining the ingredients thereof according to any method known to one of ordinary skill in the art. Preferably, the sizing composition may be made by blending the individual components of the sizing composition with a diluent to form a solution or suspension. Most preferably, the diluent is water.

The sequence of combining the ingredients can be important to forming a stable sizing composition. Preferably, the emulsion of grafted polyolefin and an aqueous fatty acid blend are blended together in water before the addition of the silane coupling agent. The silane coupling agent is preferably added last to minimize the reactions between the ingredients, and primarily to control the viscosity of the sizing composition. The sizing composition of the present invention provides viscosity, on the order of from about 8 cPs to about 150 cPs. Changes in viscosity are desirably minimized because differences in viscosity can lead to variations in the thickness of the layer of sizing composition that is deposited on the surface of the reinforcing fiber material. An increase or decrease in the thickness of the layer of sizing composition can affect the performance of the sized reinforcing fiber material in the composite.

The components such as the emulsion of grafted polyolefin polymer, the blend of fatty acids, the coupling agent, and the lubricant, as well as any of the aforementioned other optional additives are preferably combined in amounts effective to formulate the sizing composition as a stable dispersion having a storage stability of up to about 72 hours at temperatures of from about 10° C. to about 32° C. Although pH of the sizing composition is not critical, it is preferred that the final sizing composition formed by combining all the aforementioned ingredients have a pH in the range of from about 6.5 to about 11.

The sizing composition of the present invention may be applied to the reinforcing fiber material by any suitable method to form a coated reinforcing fiber material. The reinforcing fiber material to which the sizing composition of the present invention can be applied may be selected from any reinforcing fiber materials known in the art. Suitable reinforcing fiber material may be selected in any given form from materials such as glass fibers, polymer fibers (including nylon, polyaramid fibers, polyester fibers and the like), carbon or graphite fibers, natural fibers such as jute, hemp, flax, kenaf, and sisal, and any combination thereof. Preferably, a suitable reinforcing fiber material for use in this invention is a strand comprised of glass, polymer, or a blend thereof.

The reinforcing fiber material may be in the form of individual filaments, twisted yarns, strands or rovings. The sized reinforcing fiber material may be used, in continuous or discontinuous form, in the manufacture of fiber reinforced composites. The term "continuous", as used herein with regard to the reinforcing fiber material, is intended to include reinforcing fiber materials that are in the form of unbroken filaments, threads, strands, yarns or rovings, which may either be sized directly after formation in a continuous fiber-forming operation, or which may be formed and wound into packages that can be unwound at a later time to allow application of the sizing composition. The term "discontinuous", as used herein with regard to the reinforcing fiber material, is intended to include reinforcing fiber materials that have been segmented by chopping or cutting, or which are formed from a process designed to form segmented fibers, such as a fiber-forming spinner process. The segments of discontinuous reinforcing fiber material that are used in the present invention may vary in length, ranging from about 2 mm to about 25 mm in length.

Accordingly, the sizing composition may be applied, for example, to continuous filaments of a reinforcing fiber material immediately after they are formed in an in-line operation. Alternatively, the sizing composition may be applied off-line to unwound strands of reinforcing fiber material that were previously formed and packaged. The sizing may also be applied to a reinforcing fiber material that has been woven into a fabric or applied to a non-woven fibrous mat. Means for applying the sizing composition include, but are not limited to, pads, sprayers, rollers or immersion baths, which allow a substantial amount of the surfaces of the filaments of the reinforcing fiber material to be wetted with the sizing composition.

Preferably, the sizing composition is applied to a plurality of continuously forming filaments of a reinforcing fiber material as soon as they are formed from a fiber-forming apparatus such as a bushing. The bushing is preferably equipped with small apertures to allow passage of thin streams of a molten reinforcing fiber material. As the streams of molten material emerge from the bushing apertures, each stream is attenuated and pulled downward to form a long, continuous filament. The continuously forming filaments may then be gathered into strands and chopped or cut in an in-line operation, or they may be gathered into strands for winding into forming packages or doffs. The chopped strands or the forming packages are then dried.

Typically, chopped strands are dried in an oven using a temperature ranging from about 60° C. to about 200° C. Typically, forming packages are dried in a static oven for a period of about 7 hours to about 23 hours at a temperature of about 129° C., after which they are ready for use in composite-making operations.

The resulting sized reinforcing fiber material may be utilized to form a composite material having substantially no discoloration due primarily to the use of the non-discoloring sizing composition of the present invention deposited on the fibers. Suitable matrix resins for this purpose may be thermoplastic polymers, thermoset polymers, solution processable polymers, aqueous based polymers, monomers, oligomers, and polymers curable by air, heat, light, x-rays, gamma rays, microwave radiation, UV radiation, infrared radiation, corona discharge, electron beams, and other similar forms of electromagnetic radiation. Suitable matrix resins include, but are not limited to, polyolefins, modified polyolefins, saturated or unsaturated polyesters, polyamides, polyacrylamides, polyimides, polyethers, polyvinylethers, polystyrenes, polyoxides, polycarbonates, polysiloxanes, polysulfones, polyanhydrides, polyimines, polymer blends, alloys and mixtures, epoxy, polyacrylics, polyvinylesters, polyurethane, maleic resins, urea resins, melamine resins, phenol resins, and furan resins.

Preferably, the matrix resin is a polyolefin. One example of such a polyolefin is a polypropylene homopolymer commercially available as "Moplen KF 6100" from Basell Polypropylene GmbH in Mainz, Germany. The composite formulation may also include one or more conventionally known additives such as coupling agents, compatibilizers, flame retardants, pigments, antioxidants, lubricants, antistats and fillers. Examples of suitable antioxidants used during the compounding process are commercially available under the tradenames "HP2215" and "HP2225" from Ciba Specialty Chemicals Inc., Basel, Switzerland.

The process of compounding and molding the sized reinforcing fiber material and the matrix resin to form a composite may be accomplished by any means conventionally known in the art. Such compounding and molding means include, but are not limited to, extrusion, wire coating, compression molding, injection molding, extrusion-compression molding, extrusion-injection-compression molding, and long fiber injection. In a preferred embodiment of the present invention, when using polyolefin composites, the chopped fiber strand is coated with the sizing composition and is extruded with polyolefin resin matrix to form pellets. These chopped pellets then are suitably injection molded into a desired composite molded part.

The amount of matrix resin included in the composite is generally about 1% to about 99% by weight, based on the total weight of the composite formulation. Preferably, the percent composition of matrix resin is between about 30% and about 95% by weight. Most preferable is about 60% to about 95% by weight, based on the total weight of the composite.

The sizing composition of the present invention provides a coating on the reinforcing fibers which improves compatibility and adhesion with the resin matrix, and results in composites with more desirable properties such as higher short-term and long-term mechanical performance, and increased resistance to chemicals, detergents, oxidation, and hydrolysis. Although the mechanism is not fully understood, in composites, it is generally observed that the chemicals, detergents, and water that attack the matrix resin and other ingredients present in the composite formulation, also attack the glass-matrix interphase region that is responsible for the composite performance, thus lowering the adhesion and the composite performance.

Where a specific coloration of the final composite product is a desired, pigments or other color-enhancing additives may be added to the composite formulation before or during the molding process. Additionally, it may be desired that the composite formulation not contain any inherent discoloration that could affect the desired color of the molded composite product. Therefore, it is desirable that the composite have a clear or neutral coloration. In other applications, it may be preferable that the composite formulation be white, in which case a white pigment may be added. In preparing white composite formulations, it is also desirable that discoloration of the composite be kept to a minimum.

The sizing composition disclosed above may suitably comprise, consist of, or consist essentially of an emulsion comprising a grafted polyolefin, saturated fatty acids, silane coupling agents, additives and antifoaming agents. The invention illustratively disclosed herein may be practiced in the absence of any element which is not specifically disclosed herein.

The following examples are representative, but are in no way limiting as to the scope of this invention.

EXAMPLES

Overview:

Sizing compositions of the present invention were prepared according to the formulations listed in Table 1. These sizing compositions were used to prepare the chopped strands also listed in Table 1. The chopped strands described in Table 1, were extrusion compounded according to the compounding formulations listed in Table 2. Table 2 also refers to the injection molded composite test pieces used for further testing purpose. Each of the prepared composite test pieces was subjected to testing to measure properties like short-term and long-term mechanical properties, long term hydrolysis and detergent aging resistance, and coloring. The results of the various tests are reported in Tables 3 through 6.

Chopped Strand Fiber Examples (A–H, J–L):

Various chopped glass fiber strands were prepared according to sizing formulations of the present invention. Chopped strands A–H and J–L were all produced at different times. The sizing formulation used with chopped strand K contains an optical brightener, whereas the sizing formulation used with chopped strand J does not. Table 1 reports the chopped glass fibers and the sizing formulation used in their production.

TABLE 1

Exemplary size formulations and the chopped glass fiber strands produced from them Exemplary Size Formulation Ingredients

| Chopped glass fiber strands | ME 91725 | A-1100 | Moldpro 1327 | BYK-024 | Process | Fiber Diameter |
|---|---|---|---|---|---|---|
| A, B | 4.01 | 0.92 | 1.01 | 0.009 | Cratec Plus ® | 14µ |
| C, D, E | 4.01 | 0.92 | 1.01 | 0.009 | Cratec ® | 14µ |
| F | 4.01 | 0.92 | 1.01 | 0.009 | Cratec ® | 12µ |
| G, H | 4.01 | 0.93 | 0.98 | 0.017 | Cratec Plus ® | 14µ |
| J, K | Commercial chopped strand products with proprietary size | | | | Cratec Plus ® | 14µ |
| L | | | | | Cratec ® | 14µ |

Remarks:
1) ME 91725: Grafted PP aqueous emulsion from Michelman Inc.
2) A-1100: Amino silane from Osi Specialties
3) Moldpro 1327: Fatty acid dispersion from Witco
4) BYK-024: Antifoam from BYK Chemie
5) Process: Chopped starnd production process (like Cratec ® or Cratec Plus ®)
6) Cratec ®: In-line chopping process
7) Cratec Plus ®: In-line chopping followed process by bundling process
8) J: Owens Corning 146B-14P chopped glass fiber product that did not includ Optical Brightner in its size composition
9) K: Owens Corning 146B-14P commercial chopped glass fiber product that included Optical Brightner in its size composition
10) L: Owens Corning 144A-14C commercial chopped glass fiber product
11) All size formulation ingredients are given as dry parts by weight The order that the ingredients are added to make the size composition may not be critical. However, preferably, 10 liters of each formulation were prepared by first adding an emulsion of polypropylene grafted with maleic anhydride to water (the diluent), then adding the aqueous saturated fatty acid blend. The mixture was blended by stirring for between approximately 5 minutes to 30 minutes, while the temperature of the mixture during stirring was preferably maintained at approximately 25° C. After the mixture was thoroughly blended, the amino silane coupling agent was added to the composition, and the water content adjusted to provide a viscosity of preferably about 5 cps to 20 cPs.

The sizing composition can be applied to the fibers by any method known in the art, either during their production or at a later stage. Each sizing composition was applied to glass fiber strands using a submerged applicator roller process. In this process, the fibers pick up the sizing composition during their production by making contact with the surface of a rotating applicator which is submerged in a circulating bath of sizing composition. Therefore, the sizing composition is applied to the fibers during the continuous fiber production. This type of process is often referred to as an in-line process. The amount of sizing composition that is picked up by the fibers from the surface of the rotating applicator can be influenced by several factors such as speed of the applicator roll, concentration of the sizing composition, and the amount of water sprayed during the fiber production. In an in-line process, the sizing composition can be applied to fibers of different diameters, but the diameter range of 9–27µ is preferred, and the range of 11–17µ is most preferred. The sizing compositions of the present invention were applied to fibers of approximately 12–14µ in diameter as shown in Table 1.

Next in the production process, the fibers are gathered to form a strand that is chopped into strands using an in-line chopping process called the Cratec® process, as named by Owens Corning. During this process, the glass fibers are chopped in-line using a chopper and cot during their manufacturing. The chopped length of the strand may be varied from about 3 mm to 25 mm. The preferred range of the chopped strand length is from 3.5 mm to 13 mm. The most preferred range of the chopped length is from 3.5 mm to 4.5 mm. The most preferred range of the length is also suitable for high shear extrusion processes. The chopped strands are then conveyed over the belt to the drying oven to solidify the sizing composition on the glass fibers. Before drying, chopped strands may optionally be sent through the Cratec Plus® process, as named by Owens Corning, to form strand bundles of a size that are suitable for further handling and processing. The Cratec Plus® process is an extension of the Cratec® process in which the glass fibers are chopped in-line using the Cratec® process, then processed in-line in a tumbler to produce strand bundles larger than those obtained with the Cratec® process. The Cratec® and Cratec Plus® processes and related processes are described e.g., in U.S. Pat. Nos. 5,578,535, 5,693,378, 5,868,982, and 5,945,134, each is incorporated by reference. In the drying oven, the chopped strands are dried and the sizing composition on the fibers is solidified using hot air flow of controlled temperature. The dried fibers are then passed over screens to remove longs, fuzz balls, and other undesirable matter to finally collect the chopped strands in a more desirable form. Compounding Formulations Examples 1–14 and Ref 1–3, 2a, 3a:

In Table 2, the compounding formulations are used on chopped strands coated with the sizing formulation of the present invention, and on reference chopped strands.

based on the total weight of the mixture of glass and matrix resin, preferably 0.3% to 2% (by weight), and most preferably 0.5% to 1% (by weight). Antioxidants such as HP 2215 and HP 2225 from Ciba Specialty Chemicals may be used in the compounding formulations because these antioxidants are based on combinations of phenolic, phosphite, and lactone based antioxidants, thereby offering a more balanced effect in controlling the thermal degradation, especially during the processing. Optionally, to pigment the pellets, a color compensating additive such as ZnS (a white pigment available commercially under the trade name "Sachtolith HDS" from Sachtleben Chemie) may be mixed with matrix resin in the range of 0.05% to 10% pigment by weight based on the total weight of the mixture of glass and matrix resin, preferably 0.1% to 5% (by weight), and most preferably 0.5% to 3% (by weight).

Subsequently, the extrusion compounded pellets are fed into any suitable standard molding equipment to form the composite parts. In one embodiment of the present invention, molding is done using a Demag D80 injection molding machine (available from Demag Hamilton Plastics Ltd.) to produce composite test samples which were used to measure composite performance. Thus, each of the extrusion compounded pellets of Table 2 were further molded into composite test pieces by standard injection molding. Therefore, all the final injection molded composite pieces refer to the same number and nomenclature as mentioned in Table 2.

TABLE 2

Extrusion compounding formulations using chopped fibers coated with exemplary size compositions

| Extrusion compounded pellets | Chopped Strand 30% by wt | PP matrix resin 70% by wt | Coupling Agent 2% by wt | Antioxidant 1% by wt | Pigment 3% by wt |
|---|---|---|---|---|---|
| Examples 1, 2, 3, 4, 5, 6 | A,B,C,D,E,F | KF 6100 | PB 3200 | HP 2225 | |
| Examples 7, 8, 9, 10, 11, 12 | A,B,C,D,E,F | KF 6100 | PB 3200 | HP 2225 | Sachtolith HDS |
| Examples 13, 14 | G,H | KF 6100 | PB 3200 | HP 2225 | |
| Ref 1, 2, 3 | J,K,L | KF 6100 | PB 3200 | HP 2225 | |
| Ref 2a, 3a | K,L | KF 6100 | PB 3200 | HP 2225 | Sachtolith HDS |

Remarks:
1) Same nomenclature, as described for the extruded samples in Table 2, is used for the injection molded test samples that are subjected to various testing
2) Coupling agent, antioxidant, pigment % by wt concentrations are based on the total wt of the glass and PP matrix resin
3) KF 6100: Moplen KF 6100 homopolymer PP matrix resin available from Basell
4) PB 3200: Coupling agent commercially available from Uniroyal
5) HP 2225: Antioxidant HP2225 commercial grade available from Ciba Specialty Chemicals
6) Sachtolith HDS: ZnS pigment commercial grade available from Sachtleben Chemie
7) Examples 1,2,3,4,5,6: correspond respectively to A,B,C,D,E,F chopped strands used
8) Examples 7,8,9,10,11,12: correspond respectively to A,B,C,D,E,F chopped strands used
9) Ref 1, 2, 3: correspond respectively to J,K,L chopped strands used
10) Ref 2a, 3a: correspond respectively to K,L chopped strands used In the embodiments of Table 2, 30% (by weight) dried chopped strands are combined with 70% (by weight) polypropylene matrix resin, in a twin-screw extruder of type ZSK 30/2 from Werner & Pfleiderer, to form compounded pellets. During the extrusion compounding, a coupling agent such as Polybond PB 3200 from Uniroyal, may optionally be combined and mixed with the polymer matrix resin to improve the final composite's performance. Such a coupling agent can be mixed during compounding with the resin matrix using 0.1% to 10% coupling agent by weight, based on the total weight of the glass and matrix resin, preferably 0.3% to 5%, and most preferably 0.5% to 3% by weight. Also, during the extrusion compounding, various types of antioxidants such as phenolic, phosphite, or lactone based, may be combined and mixed with the matrix resin for optimum performance of the composite. Such antioxidants may be formulated using 0.1% to 3% antioxidant by weight Testing:

The resulting composite parts were then tested to measure certain physical characteristics, including tensile strength, izod and charpy impact strength, tensile fatigue, and tensile creep. The parts were also tested to simulate aging by testing the parts for resistance to hydrolysis and detergents. The results of the various tests are reported in Tables 3 through 6.

Short-Term Mechanical Performance and Coloring:

(Examples 1–12, Ref 1–3, Ref 2a, 3a

Test results reported in Table 3 are the measurement of short-term (dry as molded) mechanical performance like tensile strength and impact strength, as well as measurements relating to color for the composite molded pieces according to Examples 1–12, Ref 1–3, and Ref 2a, 3a.

TABLE 3

Short-term (dry as molded) Mechanical performance and Color performance of 30% by wt glass fiber polypropylene composites

| SHORT-TERM MECHANICAL PERFORMANCE | Ref 1 | Ref 2 | Ref 3 | Example 1 | Example 2 | Example 3 | Example 4 | Example 5 | Example 6 |
|---|---|---|---|---|---|---|---|---|---|
| Tensile Strength at break (MPa) | 92.82 | 94.85 | 89.56 | 94.71 | 93.63 | 93.81 | 95.01 | 95.94 | 98.55 |
| Izod unnotched (KJ/m2) | 50.36 | 52.43 | 44.74 | 52.19 | 53.07 | 51.54 | 53.72 | 53.43 | 53.61 |
| Izod notched (KJ/m2) | 12.35 | 13.15 | 12.23 | 12.82 | 12.91 | 12.88 | 12.78 | 12.67 | 12.76 |
| Charpy unnotched (KJ/m2) | — | 44.30 | 35.38 | 45.98 | 44.61 | 45.61 | 44.34 | 39.32 | 45.90 |
| Color | | | | | | | | | |
| L | 75.5 | 74.92 | 75.62 | 70.1 | 71.3 | 72.4 | 74.4 | 74.4 | 74.8 |
| a* | −4.1 | −3.65 | −3.96 | −2.3 | −2.8 | −2.9 | −2.9 | −2.9 | −3 |
| b* | 9.9 | 6.6 | 4.1 | 4.4 | 3.9 | 3.9 | 4.1 | 4.5 | 3.9 |

| SHORT-TERM MECHANICAL PERFORMANCE | Ref 2a | Ref 3a | Example 7 | Example 8 | Example 9 | Example 10 | Example 11 | Example 12 |
|---|---|---|---|---|---|---|---|---|
| Tensile Strength at break (MPa) | 86.99 | 86.68 | 90.98 | 91.87 | 91.43 | 91.67 | 93.54 | 95.17 |
| Izod unnotched (KJ/m2) | 48.24 | 40.78 | 51.01 | 47.90 | 50.73 | 49.43 | 49.96 | 51.90 |
| Izod notched (KJ/m2) | 13.24 | 11.89 | 12.03 | 12.39 | 12.26 | 12.29 | 12.49 | 12.07 |
| Charpy unnotched (KJ/m2) | 41.5 | 34.05 | 43.57 | 44.04 | 40.68 | 40.31 | 42.21 | 43.44 |
| Color | | | | | | | | |
| L | 92.84 | 93.14 | 92.8 | 92.8 | 92.7 | 92.9 | 93.1 | 93.4 |
| a* | −1.91 | −1.9 | −1.4 | −1.7 | −1.7 | −1.7 | −1.7 | −1.8 |
| b* | 4.14 | 2.96 | 3.6 | 3.1 | 3.1 | 3.4 | 3.4 | 3 |

Tensile strength is a measure of resistance when an elongating force is applied, and was measured using a universal testing machine from Zwick, according to ISO method 3268, and the results reported in MPa. Impact testing was carried out using impact testing machine from Zwick. IZOD impact strength, measured in KJ/m², is a measure of the degree of impact force that the composite can withstand, was measured according to ISO Method 179/1D in un-notched specimens, and according to ISO Method 180 in notched specimens (which were notched 2 mm). Charpy strength is also a measure of impact strength and was measured as resistance in KJ/m². Charpy strength is measured according to the ISO 179/D method.

The color of the composite samples was quantified using a Minolta CIELab color meter equipped with ChromaControll software. When measuring color, the standard molded pieces in disc shape were used. Color was determined in terms of whiteness (reported as an "L" value), red-green coloration (reported as an "a*" value), and blue-yellow coloration (reported as a "b*" value). A higher "L" value indicates a whiter or lighter coloring of the test piece with higher reflectance. A higher positive "a*" value indicates more red is the test piece, and a higher negative "a*" value indicates more green is the test piece.

Similarly, a higher positive "b*" value indicates more yellow in the test piece, and a higher negative "b*" value indicates more blue in the test piece. In order to achieve whiteness or to match any color, color compensating additives are commonly added. However, such compensating additives lead to complex color formation, making it very difficult, time consuming, and more costly to match the color of the final composite part. For example, to hide or mask the yellow color of a part having high "b*" value, compensating blue color using a bluing agent may be added to shift the "b*" values to a lower value. The bluing agent may also change the original "a*" value resulting in an undesirable coloration. Such color compensating additives are not necessary, but may be used with the present invention.

In the case of non-pigmented extrusion compounding formulations, each of the composites in Examples 1–6 were compared to composite samples Ref 1, Ref 2, and Ref 3. In the case of pigmented extrusion compounding formulation, each of the composite Examples 7–12 was compared to composite samples Ref 2a and Ref 3a. The results of the testing are reported in Table 3.

Long-Term Aging Performance:

Hydrolysis Testing and Detergent Testing (Examples 1–6, 13, 14, and Ref 2, Ref 3):

Tensile strength testing was performed on Examples 1–6, 13, and 14, and Ref 2 and Ref 3 after they had been subjected to hydrolytic and detergent conditions. These conditions were intended to simulate hydrolysis and detergent aging conditions that may be experienced by a laundry or washing machine tub composite part. In such a situation, wet strength and the maximum retention of the properties of the composite over an extended period of time at elevated temperature is desirable. To approximate conditions to test detergent aging resistance, samples of each composite that were molded according to the formulation of Examples 1–6, and Ref 2 and Ref 3, were immersed in a bath containing a 1% detergent solution that was maintained at a temperature of about 94° C. for up to 30 days. The detergent solution was changed every day.

Similarly, for the preparation of samples to measure hydrolysis aging resistance, the samples of each composite, molded according Examples 13 and 14, and Ref 2 and Ref 3, were immersed in water bath that is maintained at a temperature of about 94° C. In both detergent and hydrolysis testing, the samples were removed at intervals of 1, 3, 5, 10, 20, and 30 days, at which time the tensile strength of each sample was measured. The results of detergent aging resistance, testing for tensile strength and impact strength, are recorded in Table 4. The results of the hydrolysis aging resistance, testing for tensile strength and impact strength, are reported in Table 5.

TABLE 4

Long-term Detergent Aging performance of 30% by wt glass fiber polypropylene composites

| DETERGENT AGING PERFORMANCE | Aging Days | Ref 2 MPa | Ref 2 % Retention | Ref 3 MPa | Ref 3 % Retention | Example 1 MPa | Example 1 % Retention | Example 2 MPa | Example 2 % Retention | Example 3 MPa | Example 3 % Retention |
|---|---|---|---|---|---|---|---|---|---|---|---|
| Tensile Strength at break and % retention of property after aging | 0 | 94.85 | 100.00 | 89.56 | 100.00 | 94.71 | 100.00 | 93.63 | 100.00 | 93.81 | 100.00 |
| | 1 | 92.35 | 97.36 | — | — | 93.30 | 98.51 | 92.42 | 98.70 | 92.54 | 98.65 |
| | 3 | 85.43 | 90.07 | — | — | 89.69 | 94.70 | 89.89 | 96.00 | 89.02 | 94.90 |
| | 5 | 83.92 | 88.48 | 86.12 | 96.16 | 87.37 | 92.25 | 89.28 | 95.36 | 88.14 | 93.96 |
| | 10 | 80.72 | 85.10 | 82.88 | 92.54 | 84.95 | 89.69 | 85.44 | 91.25 | 85.21 | 90.83 |
| | 30 | 74.70 | 78.76 | — | — | 80.73 | 85.24 | 79.58 | 84.99 | 79.74 | 85.00 |

| | Aging Days | KJ/m2 | % Retention | | | KJ/m2 | % Retention | KJ/m2 | % Retention | KJ/m2 | % Retention |
|---|---|---|---|---|---|---|---|---|---|---|---|
| Charpy Unnotched and % retention of property after aging | 0 | 44.30 | 100.00 | — | — | 45.98 | 100.00 | 44.61 | 100.00 | 45.61 | 100.00 |
| | 1 | 37.88 | 85.51 | — | — | 39.72 | 86.40 | 39.30 | 88.10 | 41.14 | 90.21 |
| | 3 | 29.29 | 66.12 | — | — | 33.00 | 71.77 | 34.28 | 76.84 | 32.58 | 71.44 |
| | 5 | 28.77 | 64.94 | — | — | 30.88 | 67.18 | 32.10 | 71.96 | 32.80 | 71.93 |
| | 10 | 24.26 | 54.78 | — | — | 28.67 | 62.37 | 29.19 | 65.44 | 27.05 | 59.31 |
| | 30 | 21.88 | 49.39 | — | — | 28.35 | 61.67 | 25.81 | 57.86 | 25.66 | 56.27 |

| DETERGENT AGING PERFORMANCE | Aging Days | Example 4 MPa | Example 4 % Retention | Example 5 MPa | Example 5 % Retention | Example 6 MPa | Example 6 % Retention |
|---|---|---|---|---|---|---|---|
| Tensile Strength at break and % retention of property after aging | 0 | 95.01 | 100.00 | 95.94 | 100.00 | 98.55 | 100.00 |
| | 1 | 93.32 | 98.23 | 93.96 | 97.94 | 96.58 | 98.00 |
| | 3 | 89.36 | 94.05 | 89.41 | 93.19 | 92.44 | 93.79 |
| | 5 | 88.07 | 92.69 | 88.22 | 91.95 | 90.66 | 91.99 |
| | 10 | 85.29 | 89.77 | 84.46 | 88.03 | 86.32 | 87.59 |
| | 30 | 77.65 | 81.73 | 78.32 | 81.63 | — | — |

| | Aging Days | KJ/m2 | % Retention | KJ/m2 | % Retention | KJ/m2 | % Retention |
|---|---|---|---|---|---|---|---|
| Charpy Unnotched and % retention of property after aging | 0 | 44.34 | 100.00 | 39.32 | 100.00 | 45.90 | 100.00 |
| | 1 | 35.93 | 81.03 | 36.85 | 93.73 | 37.31 | 81.28 |
| | 3 | 31.57 | 71.19 | 32.04 | 81.49 | 31.93 | 69.57 |
| | 5 | 29.82 | 67.26 | 31.25 | 79.48 | 31.39 | 68.39 |
| | 10 | 25.07 | 56.54 | 27.90 | 70.96 | 27.51 | 59.94 |
| | 30 | 24.11 | 54.37 | 23.42 | 59.56 | 23.02 | 50.14 |

TABLE 5

Long-term Hydrolysis Aging performance of 30% by wt glass fiber polypropylene composites

| HYDROLYSIS AGING PERFORMANCE | Aging Days | Ref 2 MPa | Ref 2 % Retention | Ref 3 MPa | Ref 3 % Retention | Example 13 MPa | Example 13 % Retention | Example 14 MPa | Example 14 % Retention |
|---|---|---|---|---|---|---|---|---|---|
| Tensile Strength at break and % retention of property after aging | 0 | 92.74 | 100.00 | 91.32 | 100.00 | 96.09 | 100.00 | 95.33 | 100.00 |
| | 5 | 91.54 | 98.71 | 89.99 | 98.54 | 96.70 | 100.63 | 95.13 | 99.79 |
| | 10 | 90.23 | 97.29 | 88.87 | 97.32 | 94.67 | 98.53 | 93.63 | 98.22 |
| | 20 | 83.00 | 89.50 | 85.32 | 93.43 | 91.13 | 94.84 | 91.13 | 95.59 |

| | Aging Days | KJ/m2 | % Retention | KJ/ms | % Retention | KJ/m2 | % Retention | KJ/m2 | % Retention |
|---|---|---|---|---|---|---|---|---|---|
| Charpy Unnotched and % retention of property after aging | 0 | 44.44 | 100.00 | 35.13 | 100.00 | 44.13 | 100.00 | 44.61 | 100.00 |
| | 5 | 35.71 | 80.35 | 26.70 | 76.00 | 36.25 | 82.15 | 37.11 | 83.18 |
| | 10 | 32.23 | 72.52 | 25.88 | 73.66 | 33.79 | 76.58 | 34.01 | 76.23 |
| | 20 | 28.70 | 64.57 | 23.23 | 66.12 | 32.20 | 72.98 | 32.15 | 72.06 |

Long-term Mechanical Performance:

Tensile Creep and Fatigue (Examples 13, Ref 2, Ref 3):

In order to measure long-term mechanical performance, tensile fatigue and tensile creep testing was performed on Example 13, Ref 2 and Ref 3. The results are reported in Table 6. The results in Table 6 report the absolute values as well as relative % improvement shown by an example of the present invention compared to the Ref 2 and Ref 3 samples. The testing was performed as follows:

Equipment:

Instron 1331 servohydraulic testing machine with clamps in a Thermotron environmental chamber to condition molded specimens at 80° C. Testing controlled by an IBM compatible PC running Instron MAX software Method:

Tensile creep is measured by placing a 0.5 inch (1.27 cm) taper molded bar in an Instron 1331 servohydraulic machine, in load control, using a fixed mean level of 120 kg, and an amplitude of zero. The elevated temperature is 80° C. Failure time (hours to creep rupture) were averaged for three specimens.

Fatigue is measured by placing specimen in the Instron servohydraulic machine, in load control, using a sinusoidal wave form. The ratio of minimum to maximum stress on each cycle is 0.05. The test frequency is 6 Hz. Three stress levels were often chosen, 8400, 8900, and 10,000 psi. For the composite pieces of the present invention, a load of 8400 psi (about 57.92 MPa) is used. The cycles to failure were averaged for three specimens.

strength and about 49% of the initial impact strength was retained by Ref 2 during the same 30 day period.

Similarly, as seen from the results in Table 5, composites made with the sizing composition of the present invention show higher absolute values for initial strength and for strength after hydrolysis aging of up to 20 days when compared to the references Ref 2 and Ref 3. Also, composites made with the sizing composition of the present invention retain a higher percentage of their initial mechanical strength after hydrolysis aging testing for up to 20 days when compared to the references Ref 2 and Ref 3. Thus, after 20 days of hydrolysis aging testing, up to 96% of the original tensile strength and up to 73% of the original impact strength (Charpy Unnotched) was retained by composites made with the sizing composition of the present invention. However, only 90% and 93% of the original tensile strength

TABLE 6

Long term Mechanical performance of 30% by wt glass fiber polypropylene composites

| LONG-TERM MECHANICAL PERFORMANCE | Ref 2 | Ref 3 | Example 13 | Invention % improvement over | |
|---|---|---|---|---|---|
| | | | | Ref 2 | Ref 3 |
| Tensile Fatigue Cycles to failure (57.92 Mpa) | 2.34 | 1.26 | 3.17 | 35.47 | 151.59 |
| Tensile Creep Failure hours (120 kg, 80° C.) | 3.9 | 0.7 | 5.1 | 30.77 | 628.57 |

Summary of Results:

As seen in Table 3, the composite samples made with the sizing composition of the present invention in non-pigmented compounding formulations, show much more desirable short-term (dry as molded) mechanical properties (e.g., tensile strength, impact strength) compared to the reference composite samples Ref 1 and Ref 3, although they are similar to Ref 2.

In pigmented compounding formulations, the composite samples made with the sizing composition of the present invention show more desirable short-term mechanical properties compared to Ref 2a and Ref 3a. The lowest short-term mechanical performance is measured for Ref 3a, both in pigmented as well as non-pigmented compounding formulations.

In non-pigmented compounding formulations, the composites made with the sizing composition of the present invention have lower "a*" and "b*" values indicating more neutral coloring compared to Ref 1, Ref 2, and Ref 3. In pigmented compounding formulations, the composites made with the sizing composition of the present invention have better whiteness compared to Ref 2a, but are similar to Ref 3a. Composite samples made with the sizing composition of the present invention and 12μ fibers show higher tensile strength than any composites made with 14μ fibers.

As shown in Table 4, composites made using the sizing composition of the present invention show better long-term aging and detergent resistance compared to the reference composites. As is seen by the results, the composites made using the sizing composition of the present invention have higher absolute values for initial strength and strength after detergent aging of up to 30 days when compared to the references Ref 2 and Ref 3. Also, the composites made using the sizing composition of the present invention retain a higher percentage of their initial mechanical strength after aging for up to 30 days when compared to the references Ref 2 and Ref 3. Thus, after 30 days of detergent aging, up to 85% of the initial tensile strength and up to 62% of the initial impact strength (Charpy Unnotched) was retained by the composite made using the sizing composition of the present invention. However, only about 79% of the initial tensile could be retained by Ref 2 and Ref 3, respectively, and only 65% and 66% of the original impact strength could be retained by Ref 2 and Ref 3 respectively.

The results of long-term mechanical performance for the composites are reported in Table 6. As seen form the results, it is clear that composites made with the sizing composition of the present invention provide a large improvement, both in tensile fatigue and tensile creep performance, over both the Ref 2 and the Ref 3. Thus, for tensile fatigue, the % improvement of the long-term mechanical performance for the composite made with the sizing composition of the present invention, versus Ref 2 was 35% and versus Ref 3 was 152%. Similarly, for tensile creep, the % improvement of the long-term mechanical performance for the composite made with the sizing composition of the present invention versus Ref 2 was 31% and versus Ref 3 was 629%.

Thus the composite parts made using the fibers coated with sizing composition of the present invention, offer better short-term mechanical properties, improved long-term mechanical properties, improved detergent and hydrolysis aging resistance, higher retention of initial strength after aging, and better coloring.

It is believed that Applicants' invention includes many other embodiments which are not herein specifically described. Accordingly this disclosure should not be read as being limited to the foregoing examples or preferred embodiments.

We claim:

1. A substantially non-discoloring sizing composition for reinforcing fiber materials consisting essentially of:
    from about 35–70% by weight of a grafted polyolefin emulsion based on the total weight of the sizing composition;
    two or more saturated fatty acids; and
    at least two silane coupling agents.

2. The sizing composition of claim 1, wherein the emulsion comprises an aqueous solvent.

3. The sizing composition of claim 1, wherein the grafted polyolefin comprises a homopolymer of polypropylene or a random copolymer of propylene and ethylene.

4. The sizing composition of claim 1, wherein the grafted polyolefin comprises a grafted portion selected from the group consisting of acid anhydride, carboxylic acid, hydroxyl, amino, amide, ester, isocyanate, double bonds and epoxy.

5. The sizing composition of claim 1, wherein said sizing composition is without a color compensating additive.

6. The sizing composition of claim 1, wherein the grafted polyolefin has a level of grafting between about 0.05% to about 15% by weight based on the total weight of the grafted polyolefin.

7. The sizing composition of claim 1, wherein the saturated fatty acids contain a $C_8$–$C_{36}$ saturated fatty acid.

8. The sizing composition of claim 1, wherein the saturated fatty acids comprise two or more saturated fatty acids selected from the group consisting of myristic acid, palmitic acid, pentadecanoic acid, margeric acid, stearic acid, behenic acid and sebacic acid.

9. The sizing composition of claim 1, wherein the saturated fatty acids comprise an aqueous mixture of palmitic acid, sebacic acid, and stearic acid.

10. The sizing composition of claim 1, wherein the emulsion comprises a grafted polyolefin comprising an aqueous emulsion of a polypropylene grafted with maleic anhydride.

11. The sizing composition of claim 1, wherein one of the silane coupling agents is an amino silane coupling agent.

12. The sizing composition of claim 1, further comprising an antifoaming agent.

13. The sizing composition of claim 1, having a viscosity of from about 8 cPs to about 150 cPa.

14. A fiber coated with the sizing composition of claim 1.

15. A composite comprising the fiber of claim 14.

16. A method of manufacturing a substantially non-discoloring reinforcing fiber material consisting essentially of:
  a) preparing a sizing composition comprising:
    from about 35–70% by weight of a grafted polyolefin emulsion based on the total weight of the sizing composition,
    two or more saturated fatty acids, and
    at least two silane coupling agents;
  b) contacting a plurality of filaments of a reinforcing fiber material with the sizing composition; and
  c) allowing the sizing composition to solidify on the surfaces of the plurality of filaments to form a substantially non-discoloring reinforcing fiber material.

17. The method of claim 16, wherein the step of contacting comprises contacting said filaments with the sizing composition immediately after they are continuously formed from a fiber-forming bushing.

18. A method of making a fiber-reinforced composite having minimal discoloration, comprising:
  a) applying a substantially non-discoloring sizing composition consisting essentially of:
    from about 35–70% by weight of a grafted polyolefin emulsion based on the total weight of the sizing composition,
    two or more saturated fatty acids, and
    at least two silane coupling agents on the surfaces of a reinforcing fiber material to form a sized reinforcing fiber material; and
  b) compounding and molding the sized reinforcing fiber material with a matrix resin to form a fiber-reinforced composite having minimal discoloration.

19. The method of claim 18, wherein the matrix resin is selected from the group consisting of polyolefins, polyesters, polyamides, polyacrylamides, polyimides, polyethers, polyvinylethers, polystyrenes, polyoxides, polycarbonates, polysiloxanes, polysulfones, polyanhydrides, polyimines, epoxy, polyacrylics, polyvinylesters, polyurethane, maleic resins, urea resins, melamine resins, phenol resins, furan resins, polymer blends, alloys and mixtures thereof.

20. The method of claim 18, wherein the step of compounding and molding the sized reinforcing fiber material is selected from extrusion molding, compression molding and injection molding.

21. The method of claim 18, wherein the composite further comprises a polyolefin as a matrix resin.

* * * * *